HOLCROFT & SMITH.
Potato-Digger.

No. 37,964.  
Patented Mar. 24, 1863.

Witnesses:

Inventor:

UNITED STATES PATENT OFFICE.

HENRY HOLCROFT AND C. S. SMITH, OF MEDIA, PENNSYLVANIA.

IMPROVEMENT IN POTATO-DIGGERS.

Specification forming part of Letters Patent No. 37,964, dated March 24, 1863.

*To all whom it may concern:*

Be it known that we, HENRY HOLCROFT and C. S. SMITH, both of Media, in the county of Delaware and State of Pennsylvania, have invented a new and Improved Potato-Digger; and we do hereby declare that the following is a full, clear, and exact description of the same, reference being had to the accompanying drawings, forming a part of this specification, in which—

Figure 1:
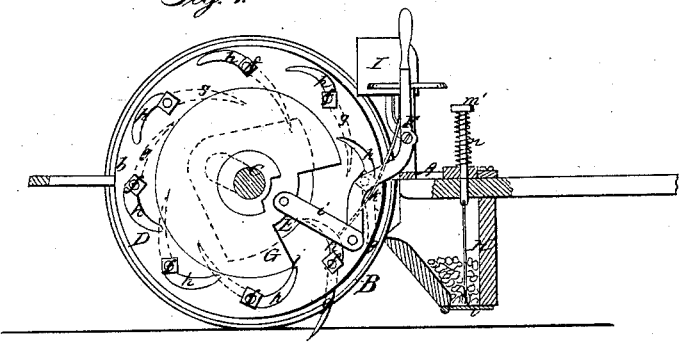
Figure 2:
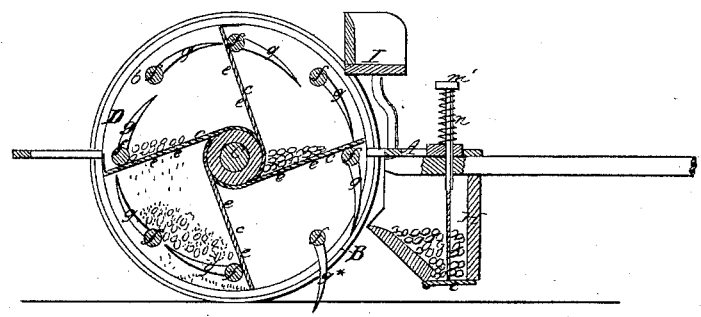
Figure 3:
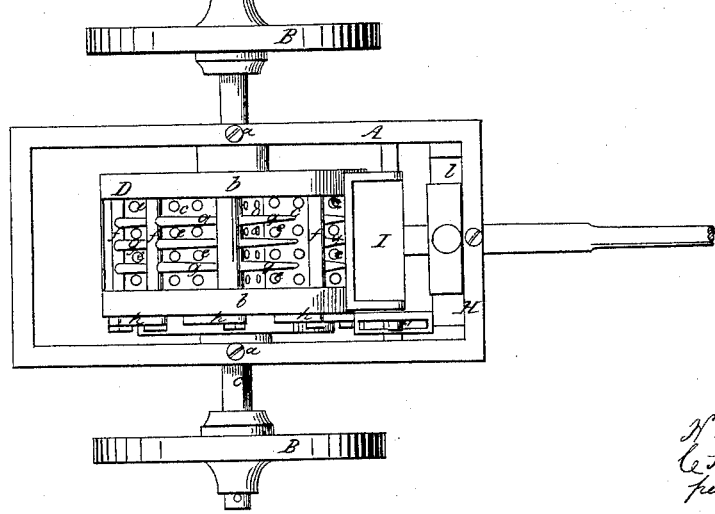

Figure 1 represents a sectional side elevation of my invention. Fig. 2 is a longitudinal vertical section of the same. Fig. 3 is a plan or top view of the same.

Similar letters of reference in the three views indicate corresponding parts.

This invention consists in the arrangement of a series of self-adjusting rotary digging-teeth, the position of which is governed by a stationary cam and regulated by an adjustable cam, in combination with a rotary sifting-drum provided with a series of perforated partitions to separate the dirt from the potatoes, and with a receiving-box into which the potates are discharged from the sifting-drum, and which is provided with a spring-valve to be opened whenever the receiving-box is full, or when it is desirable to discharge its contents, in such a manner that the potatoes are dug up by the digging-teeth and separated from the dirt by the sifting-drum, and that the potatoes, after having been collected in the receiving-box, can be deposited on the ground or in bags in such quantities as may be desired.

To enable those skilled in the art to make and use our invention, we will proceed to describe it with reference to the drawings.

A represents a frame made of iron or any other suitable material. This frame is firmly fastened by means of screws $a$ to the axle C, which rests in the wheels B, said wheels being made to rotate loosely on the axle.

D is the sifting-drum, which consists of two disks, $b$, which rotate freely on the axle C, and which are connected by four (more or less) partitions, $c$, placed at right angles to each other and tangentially toward the hub $d$, as clearly shown in Fig. 2 of the drawings. Said partitions are perforated with holes $e$, thus forming sieves, which serve to separate the dirt from the potatoes. The disks $b$ form the bearings for a series of shafts, $f$, which carry the digging-teeth $g$, and these shafts extend through one of the disks far enough to afford room for curved arms or toes $h$, which are secured to the ends of the shafts by nuts or any other suitable means. The digging-teeth by their own gravity have a tendency to place themselves in a vertical position with their points down, and as the drum D revolves the several sets of teeth are successively brought in the position shown at $g^*$ in Figs. 1 and 2. In this position the teeth enter the ground, and they are prevented from turning back by the toe $h^*$, Fig. 1, coming in contact with the adjustable cam E. This cam slides on the axle C, and it connects by a link, $i$, with a hand-lever, F, so that it can be drawn in or out at pleasure. As the motion of the drum D proceeds, the toes are brought in contact with the shoulder $j$ of the stationary cam G, and the digging-teeth are turned up to the position shown in Figs. 1 and 2, and on being turned up they carry with them all the potatoes which they have met during their passage through the ground, and also a large quantity of dirt. The dirt drops through between the digging-teeth, and as the drum continues to rotate, the potatoes and such dirt as may still adhere to them are landed on one of the perforated partitions. By the motion of the drum and by the friction of the potatoes against each other the dirt adhering to the potatoes is separated from them and caused to pass through the perforations in the partitions $c$, and the potatoes, almost perfectly free from dirt, are finally deposited in the receiving-box H as the perforated partitions pass said box in successive order. The correct position of the digging-teeth, as the same enter the ground, is insured by the spring $k$, which acts on the toes $h$ as the same come opposite a recess in the stationary cam G, and which forces their points up to the edge of the adjustable cam E. By drawing this cam out, so that its edge forms a continuation of the circumference of the stationary cam, the toes are prevented dropping into the recess of said cam, and the digging-teeth are not permitted to project beyond the edges of the disks and to enter the ground. The machine can thus be drawn along without producing a rotary motion of the sifting-drum.

The hand-lever F, which regulates the position of the adjustable cam E, extends up on the side of the driver's seat I, so that it can easily be operated without leaving said seat.

The receiving-box H is provided with a hinged bottom or valve, $l$, which is suspended from a bar, $m$, which is forced up by a spring, $n$, so that the valve is closed. The top of the bar $m$ is provided with a button or foot-board, $m'$, which is so situated that it can conveniently be reached from the driver's seat. By depressing the bar $m$ the valve $l$ is opened and the contents of the receiving-box are discharged.

By this machine potatoes and other vegetables of a similar nature can be dug up and separated from the dirt adhering to them, without any exertion of the driver, in a short time and in a very convenient manner.

What we claim as new, and desire to secure by Letters Patent, is—

1. The arrangement of the sifting drum D with the perforated partitions $c$ and rotary digging-teeth $g$, constructed and operating in the manner and for the purpose herein shown and described.

2. The arrangement of the adjustable cam E, in combination with the stationary cam G, toes $h$, and digging-teeth $g$, constructed and operating substantially as and for the purpose herein set forth.

3. The arrangement of the sifting-drum D with perforated partitions $c$ and self-adjusting rotary digging-teeth $g$, in combination with the receiving-box H, constructed and operating substantially as and for the purpose set forth.

HENRY HOLCROFT.
C. S. SMITH.

Witnesses:
EDMUND SISLER,
JAMES HOLCROFT.